United States Patent
Ho

(10) Patent No.: US 8,136,959 B2
(45) Date of Patent: *Mar. 20, 2012

(54) LIGHT-EMITTING STRIP STRUCTURE WITH LIGHT GUIDING EFFECT

(76) Inventor: Chang-Hsien Ho, Taoyuan County (TW)

( * ) Notice: Subject to any disclaimer, the term of this patent is extended or adjusted under 35 U.S.C. 154(b) by 247 days.

This patent is subject to a terminal disclaimer.

(21) Appl. No.: 12/320,383

(22) Filed: Jan. 26, 2009

(65) Prior Publication Data

US 2010/0157584 A1 Jun. 24, 2010

(30) Foreign Application Priority Data

Dec. 19, 2008 (TW) ................ 97149603 A

(51) Int. Cl.
*F21S 4/00* (2006.01)

(52) U.S. Cl. ........ 362/223; 362/551; 362/562; 362/565; 362/616

(58) Field of Classification Search ................ 362/223, 362/551, 565, 570, 576, 615–616, 618–619, 362/627–629, 562; 385/146
See application file for complete search history.

(56) References Cited

U.S. PATENT DOCUMENTS

| | | | |
|---|---|---|---|
| 4,600,974 A * | 7/1986 | Lew et al. ............. | 362/102 |
| 6,481,882 B1 * | 11/2002 | Pojar ............. | 362/559 |
| 6,523,986 B1 * | 2/2003 | Hoffmann ............. | 362/576 |
| 6,742,909 B2 * | 6/2004 | Conti et al. ............. | 362/84 |
| 6,927,910 B2 * | 8/2005 | Kang ............. | 359/485.04 |
| 2005/0270774 A1 * | 12/2005 | Pan ............. | 362/217 |
| 2010/0232175 A1 * | 9/2010 | Ho ............. | 362/551 |

* cited by examiner

*Primary Examiner* — Stephen F Husar
*Assistant Examiner* — Meghan Dunwiddie
(74) *Attorney, Agent, or Firm* — Bacon & Thomas, PLLC

(57) ABSTRACT

A light-emitting strip structure with light guiding effect, which is a hollow light guide strip body made of transparent material. The light guide strip body is formed with at least one axial internal chamber. Recessed/raised sections are formed on a wall of the internal chamber for changing light path. When a light source projects light into the internal chamber, the recessed/raised sections will deflect or reflect the projected light, whereby the light guide strip body can emit light outward. A color bar or a light reflection strip is implanted in the internal chamber. In addition, a light absorption material is sprayed on the wall of the internal chamber or a photosensitive gas is filled in the internal chamber. Accordingly, the light guide strip body can emit colorful light in various patterns so as to provide enhanced decorative or warning effect. The light guide strip body is flexible and antishock.

30 Claims, 10 Drawing Sheets

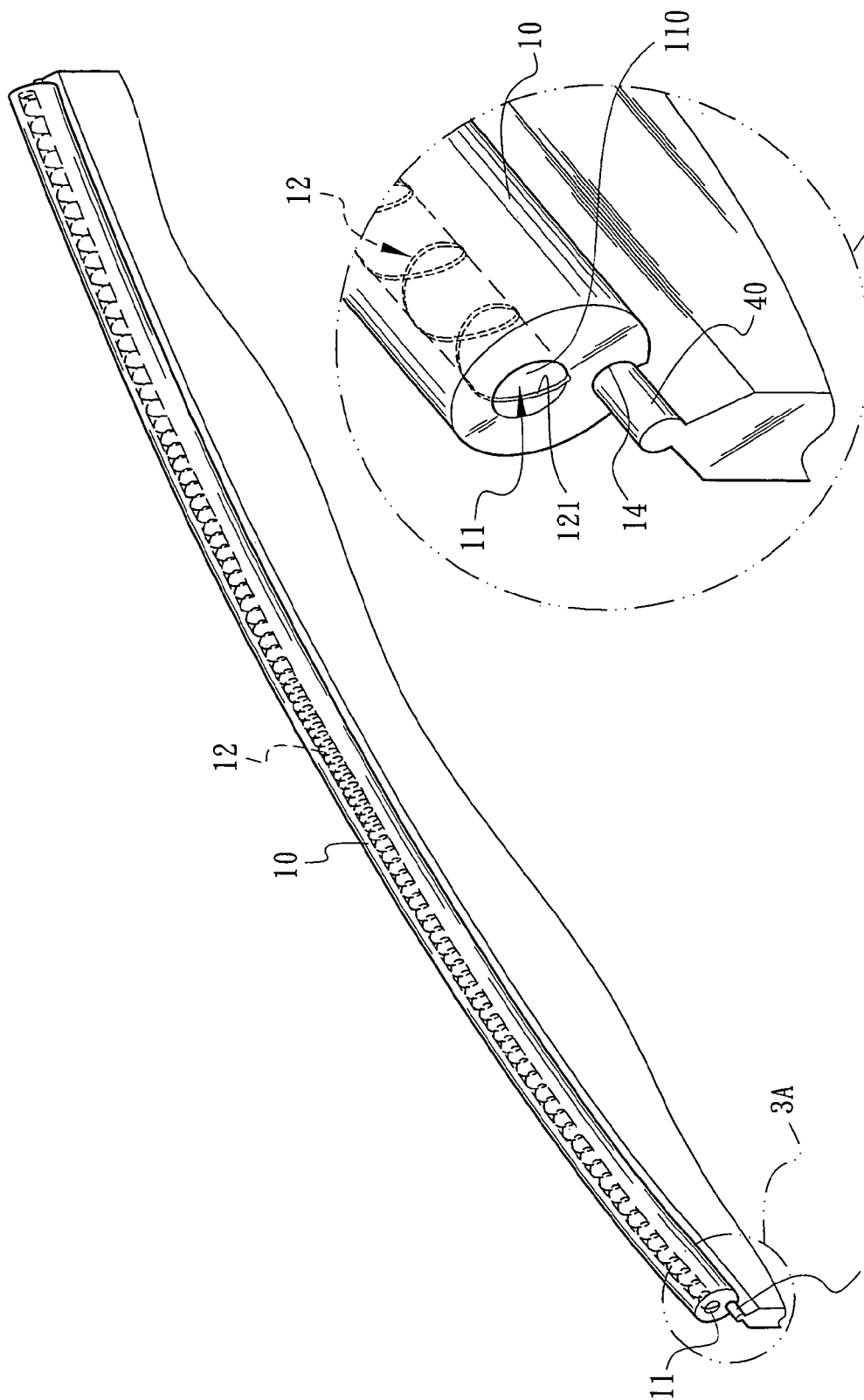

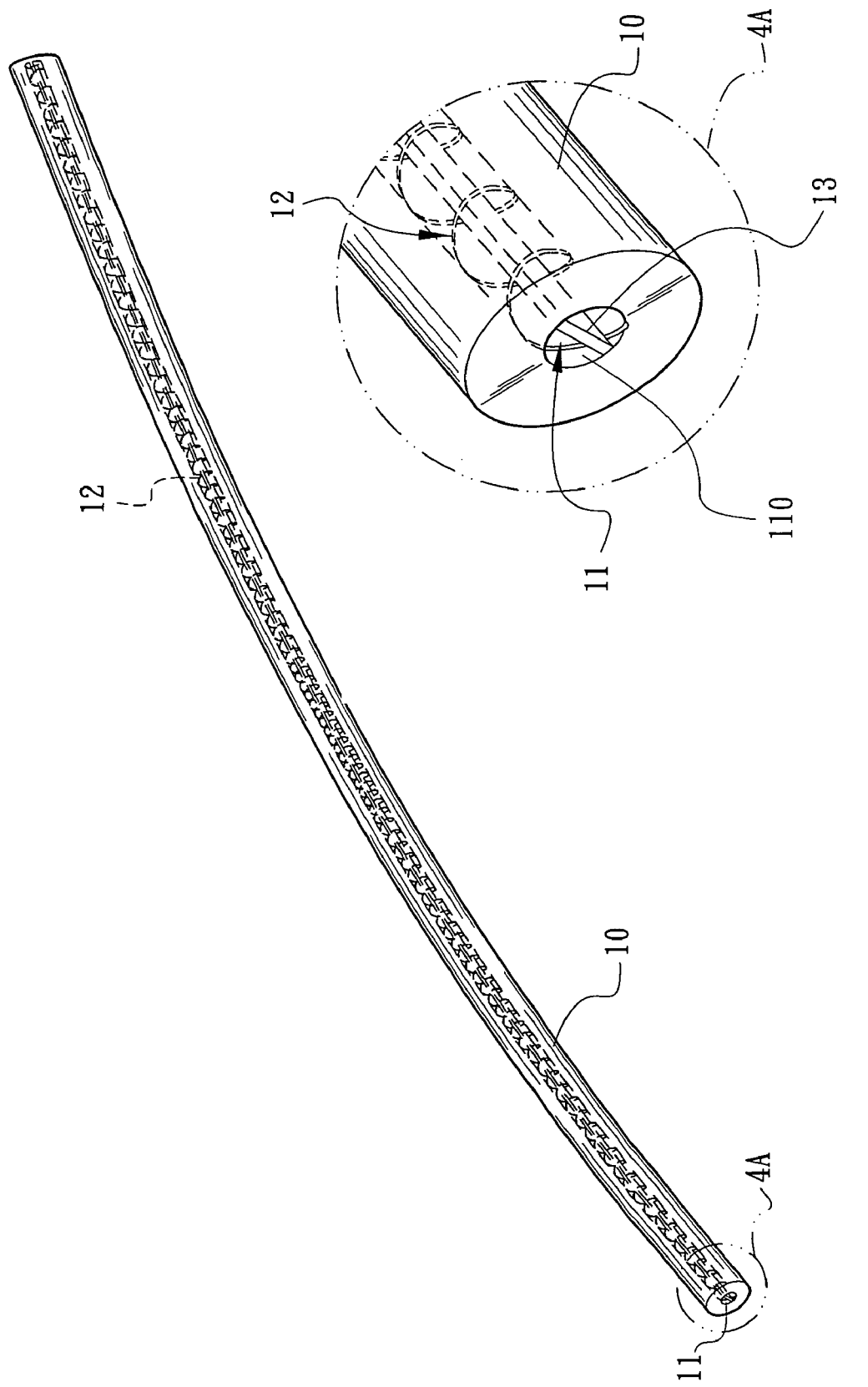

LIGHT-EMITTING STRIP STRUCTURE WITH LIGHT GUIDING EFFECT

BACKGROUND OF THE INVENTION

The present invention is related to a light-emitting strip structure with light guiding effect, and more particularly to a hollow light guide strip body made of transparent material. The light guide strip body is formed with an axial internal chamber. Multiple recessed/raised sections are formed on a wall of the internal chamber for deflecting or reflecting light projected into the internal chamber from a light source. Therefore, the light guide strip body can emit light outward to provide enhanced decorative or warning effect.

A conventional light tube is made of a hard tubular body such as a glass tube. The tubular body is bent into a desired shape. An inert gas is filled in the tubular body. When electric current passes through the light tube, the inert gas will discharge to emit light. Recently, various light bulbs and LED lights have been developed The light bulbs and LED lights are able to emit colorful light. The conventional light tube is relatively hard to manufacture so that the manufacturing cost is relatively high. Moreover, the conventional light tube is likely to break and damage due to infiltration of water (such as rainwater) or impact. Furthermore, one light tube can only emit single color of light at high power consumption. Also, the configuration and size of the light tube cannot be miniaturized and changed. When it is desired to present different colors of light, it is necessary to use at least two light tubes. Accordingly, it is quite inconvenient and expensive to use such light tube.

A low-cost light reflection sign or a low-brightness flickering device is often applied to a transportation tool for providing warning effect for environmental persons, especially in a dim place. Such reflection sign or flickering device can only achieve limited warning effect, especially to those drivers driving cars at high speed. Also, it is rare for a passenger to wear a self-lighting safety device. Therefore, in an outdoor environment with insufficient illumination, the passenger is likely to be hit by a transportation tool.

It is therefore tried by the applicant to provide a low-cost light-emitting strip structure, which is able to more apparently emit light within larger range to provide enhanced decorative or warning effect.

SUMMARY OF THE INVENTION

It is therefore a primary object of the present invention to provide a light-emitting strip structure with light guiding effect. The light-emitting strip structure is a hollow light guide strip body made of transparent material. The light guide strip body is formed with an axial internal chamber. Recessed/raised sections are formed on a wall of the internal chamber for changing light path. When a light source projects light into the internal chamber, the recessed/raised sections will deflect or reflect the projected light, whereby the light guide strip body can emit light outward. Incooperation with the light guide strip body, a point light source can more apparently output light within a larger range so as to save energy. By means of changing the pattern and density in which the recessed/raised sections are distributed over the wall of the internal chamber, the light guide strip body can emit light in different patterns to provide more apparent decorative or warning effect.

It is a further object of the present invention to provide the above light-emitting strip structure, in which a light reflection article can be disposed in the internal chamber or a photosensitive gas can be filled in the internal chamber to change light path. Accordingly, when the light source projects light into the internal chamber, the light will be reflected in a set direction to achieve versatile and colorful lighting effect so as to provide enhanced decorative or warning effect.

It is still a further object of the present invention to provide the above light-emitting strip structure, in which the light guide strip body is flexible so that the possibility of damage of the light guide strip body due to impact is minimized.

According to the above objects, the light-emitting strip structure with light guiding effect of the present invention is a hollow light guide strip body made of transparent material. The light guide strip body is formed with an axial internal chamber. Recessed/raised sections are formed on a wall of the internal chamber for changing light path. A light source can be arranged at least one end of the light guide strip body. When the light source projects light into the internal chamber, the recessed/raised sections will deflect or reflect the projected light, whereby the light guide strip body can emit light outward to achieve lighting effect.

A color bar or a light reflection strip is implanted in the internal chamber. In addition, a light absorption material is sprayed on the wall of the internal chamber or a photosensitive gas is filled in the internal chamber. Accordingly, the light guide strip body can emit colorful light in various patterns so as to provide enhanced decorative or warning effect.

When the light source projects light into the internal chamber, the recessed/raised sections will deflect or reflect the projected light to achieve lighting effect. Accordingly, a point light source can more apparently output light within a larger range throughout a certain length of the light guide strip body.

An outer circumference of the light guide strip body is formed with a channel. An insertion rib of an article can be directly inserted into the channel to connect the light guide strip body with the article.

The recessed/raised sections can be spiral recessed/raised stripes continuously spirally extending through the wall of the internal chamber. The spiral recessed/raised stripes serve to deflect or reflect in all directions so that the light guide strip body is able to emit light universally.

A light absorption material is sprayed on the wall of the internal chamber, a color bar is implanted in the internal chamber, or a photosensitive gas (such as an inert gas) is filled in the internal chamber. Accordingly, the light guide strip body can emit colorful light in various patterns so as to provide enhanced decorative or warning effect in different fields.

The light guide strip body has certain flexibility (softness) and is antishock. Therefore, the light guide strip body will not be damaged due to impact of alien article or shock. Accordingly, the flexible light guide strip body can be applied to a pole of a road warning sign or used as a light-emitting link between two road barriers to expand the lighting range and enhance warning effect.

The present invention can be best understood through the following description and accompanying drawings wherein:

BRIEF DESCRIPTION OF THE DRAWINGS

FIG. 1A is an enlarged view of circled area 1A of FIG. 1;

FIG. 3 is a perspective view of a third embodiment of the present invention;

FIG. 3A is an enlarged view of circled area 3A of FIG. 3;

FIG. 4 is a perspective view of a fourth embodiment of the present invention;

FIG. 4A is an enlarged view of circled area 4A of FIG. 4;

FIG. 8A is an enlarged view of circled area 8A of FIG. 8;

DETAILED DESCRIPTION OF THE PREFERRED EMBODIMENTS

Figure 1:
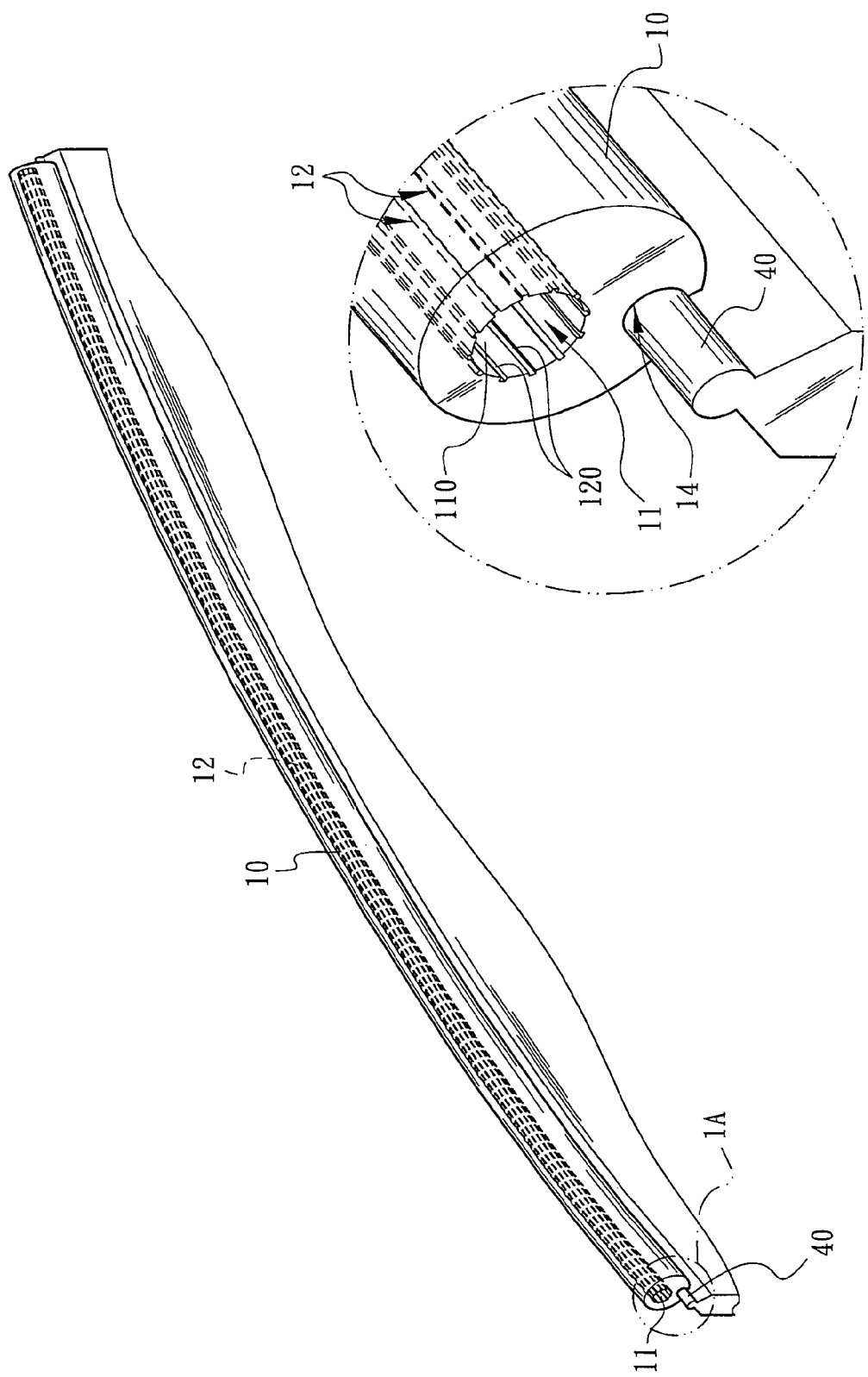
FIG. 1 is a perspective view of a first embodiment of the present invention.
Figures 2, 2A:
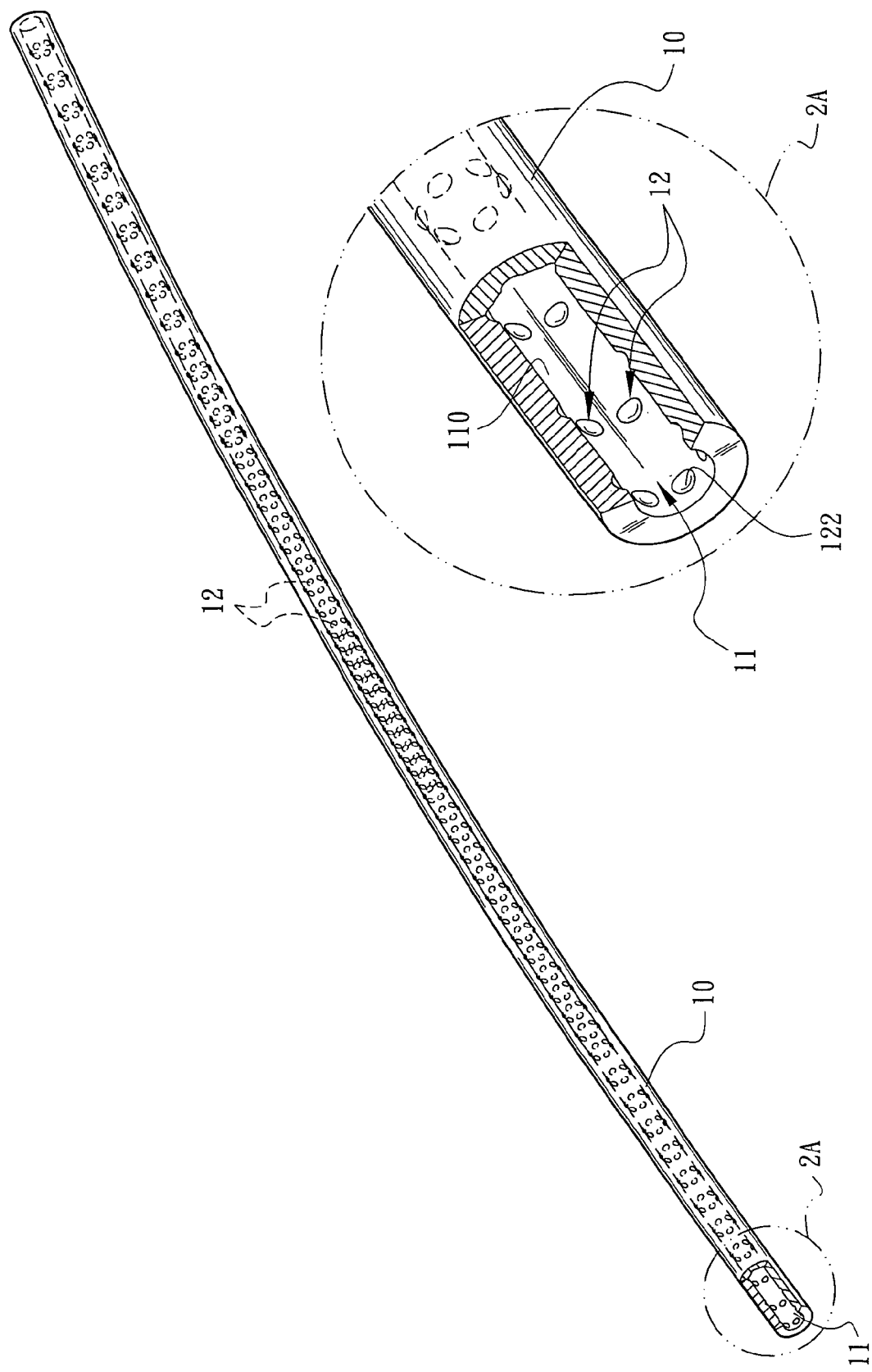
FIG. 2 is a perspective view of a second embodiment of the present invention.
FIG. 2A is an enlarged view of circled area 2A of FIG. 2.

Please refer to FIGS. 1 to 3. The present invention is a hollow light guide strip body 10 made of transparent material. The light guide strip body 10 is formed with an internal chamber 11 extending along an axis of the light guide strip body 10. At least one recessed/raised section 12 is formed on a wall 110 of the internal chamber 11 for changing light path.

As shown in FIG. 1, the recessed/raised sections 12 are axial parallel recessed/raised stripes 120 distributed at least partially over the wall 110 of the internal chamber 11. Alternatively, as shown in FIG. 3, the recessed/raised section 12 is at least one spiral recessed/raised stripe 121 spirally extending through the wall 110 of the internal chamber 11. A light source 20 can be positioned beside one end of the light guide strip body 10 to project light thereto. When the light source 20 projects light in a direction to the internal chamber 11 of the light guide strip body 10, the recessed/raised section 12 will deflect or reflect the projected light. In this case, every parts of the recessed/raised stripe 121 will guide and emit light to outer side of the light guide strip body 10. Therefore, an observer can easily clearly see the light guide strip body 10 in any direction or at any angle. Accordingly, the light guide strip body 10 can provide apparent warning effect.

The recessed/raised section 12 can have different configurations. In FIG. 2, the recessed/raised sections 12 are recessed/raised dots 122 distributed over the wall 110 of the internal chamber 11 with a uniform or non-uniform density. In addition, a color bar or a light reflection strip 13 can be implanted in the internal chamber 11 (as shown in FIG. 4). Moreover, a light absorption material can be sprayed on the wall 110 or a photosensitive gas with a certain concentration can be filled into the internal chamber 11 to achieve versatile light projection effects for different application fields.

Figure 5:
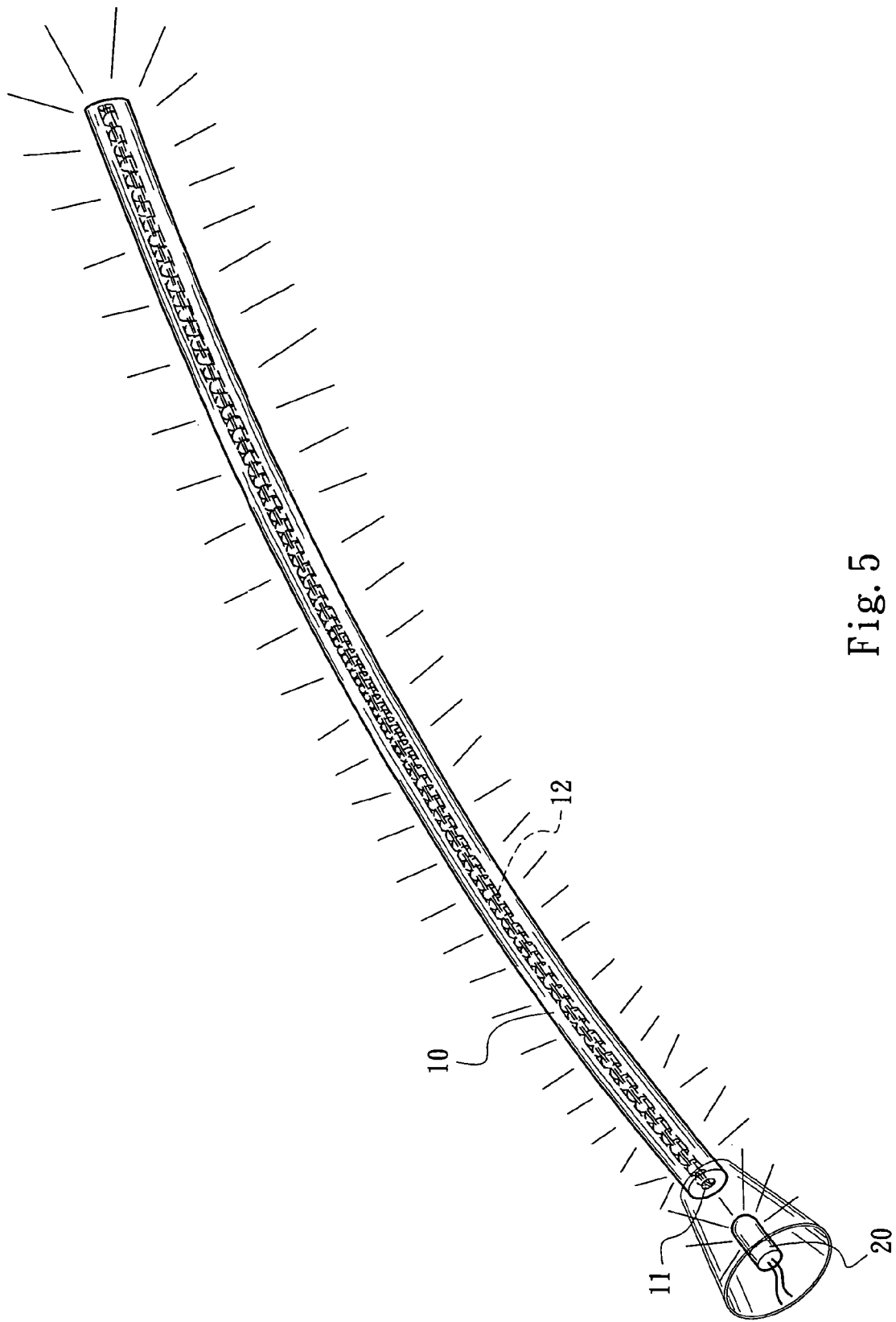
FIG. 5 is a perspective view showing that the present invention is co-used with a light source.
Figure 6A:
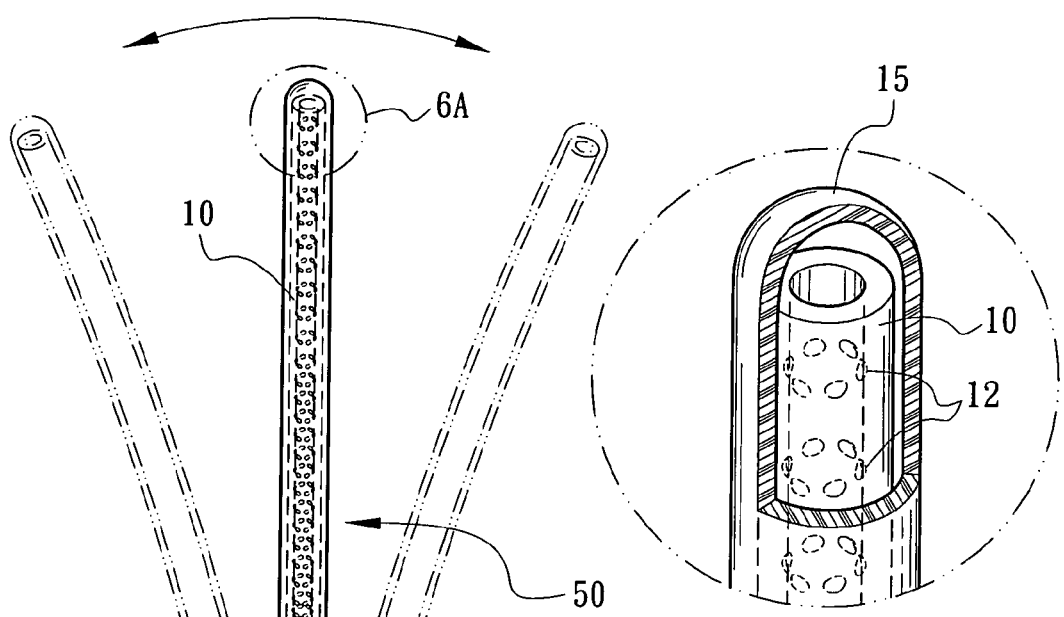
FIG. 6A is an enlarged view of circled area 6A of FIG. 6.
Figure 6:
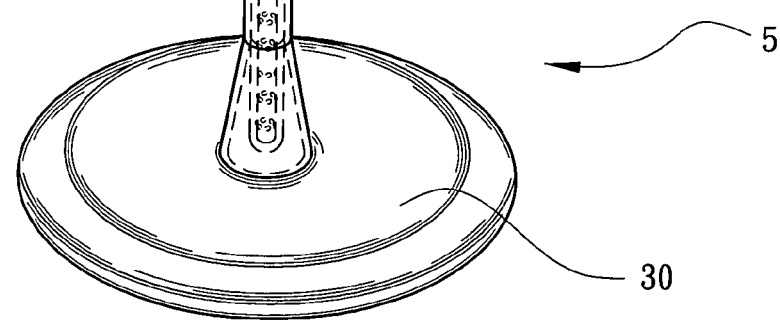
FIG. 6 is a perspective view showing that the present invention is combined with a base seat.

FIGS. 5 and 6 show another embodiment of the present invention, in which one end of the light guide strip body 10 is connected with a locating base seat 30. The light source 20 is positioned in the locating base seat 30. The locating base seat 30 is located on the ground or fixed on an article. Alternatively, as shown in FIGS. 1 and 3, an outer circumference of the light guide strip body 10 can be formed with a channel 14. An insertion rib 40 of an article can be directly inserted into the channel 14 to connect the light guide strip body 10 with the article.

Figure 7:
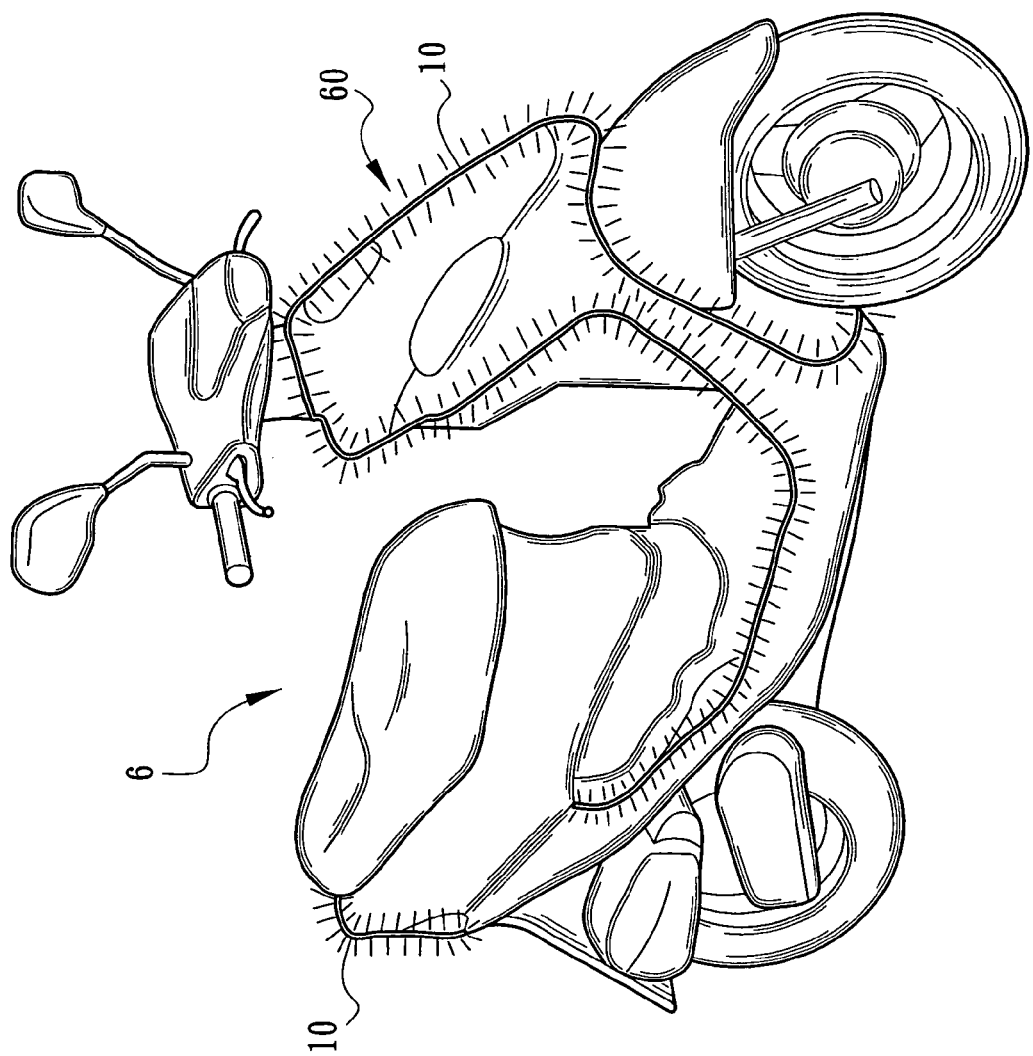
FIG. 7 is a perspective view showing that the present invention is applied to a motorcycle as a light-emitting shape highlighter.
Figure 8:
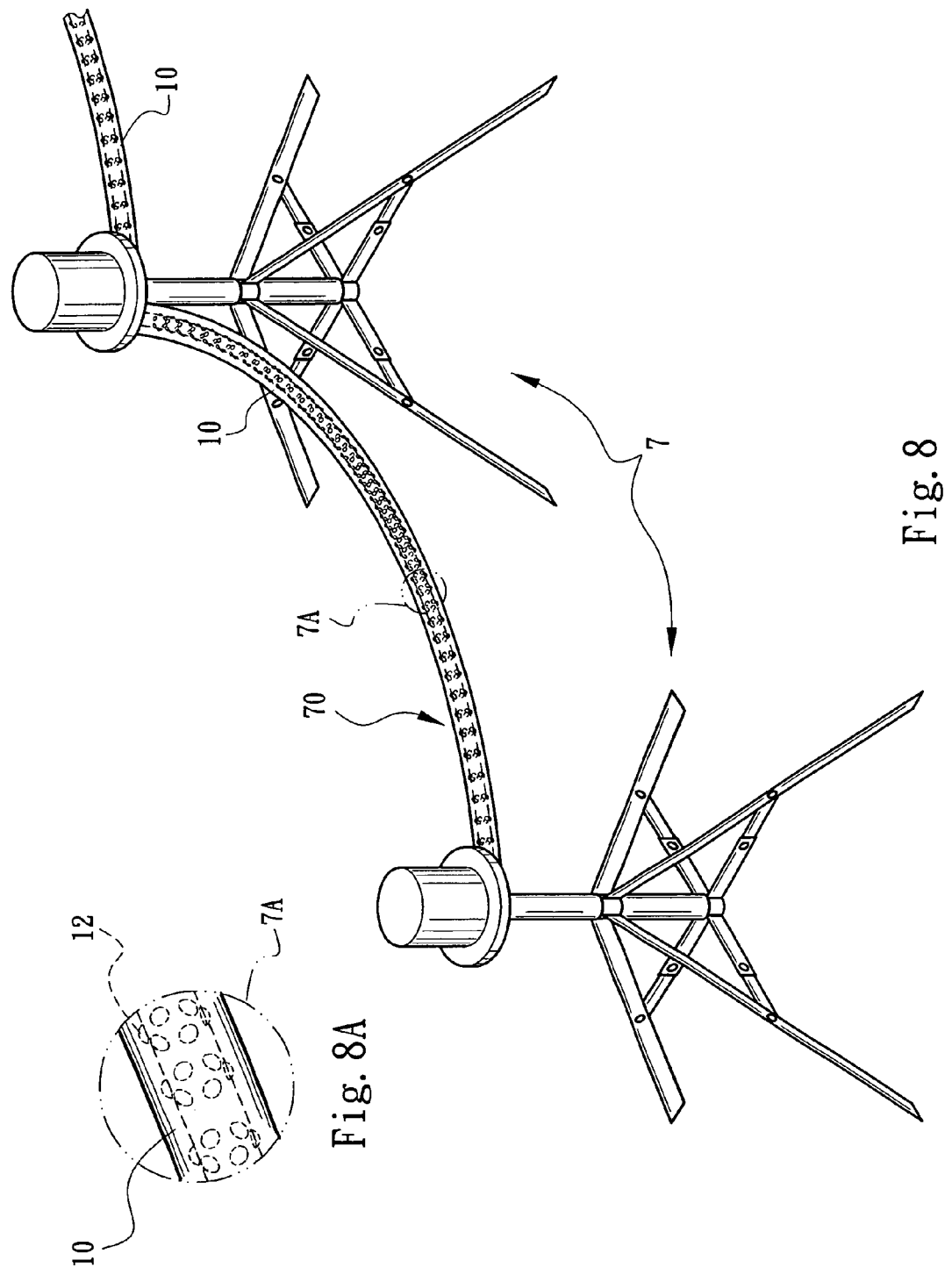
FIG. 8 is a perspective view showing that the present invention is connected between two road barriers as a light-emitting link.
Figure 9:
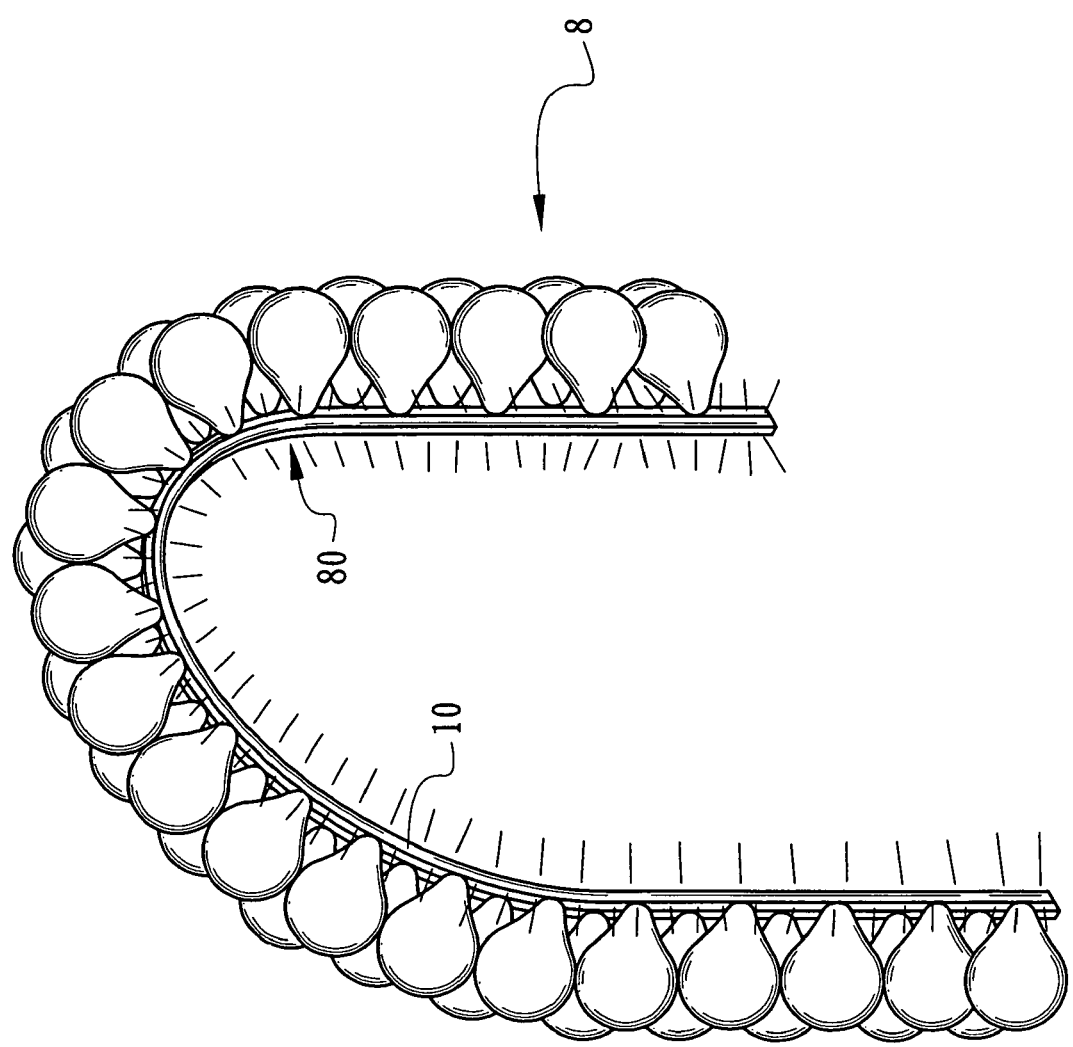
FIG. 9 is a perspective view showing that the present invention is applied to an archway as a light-emitting decoration.
Figure 10:
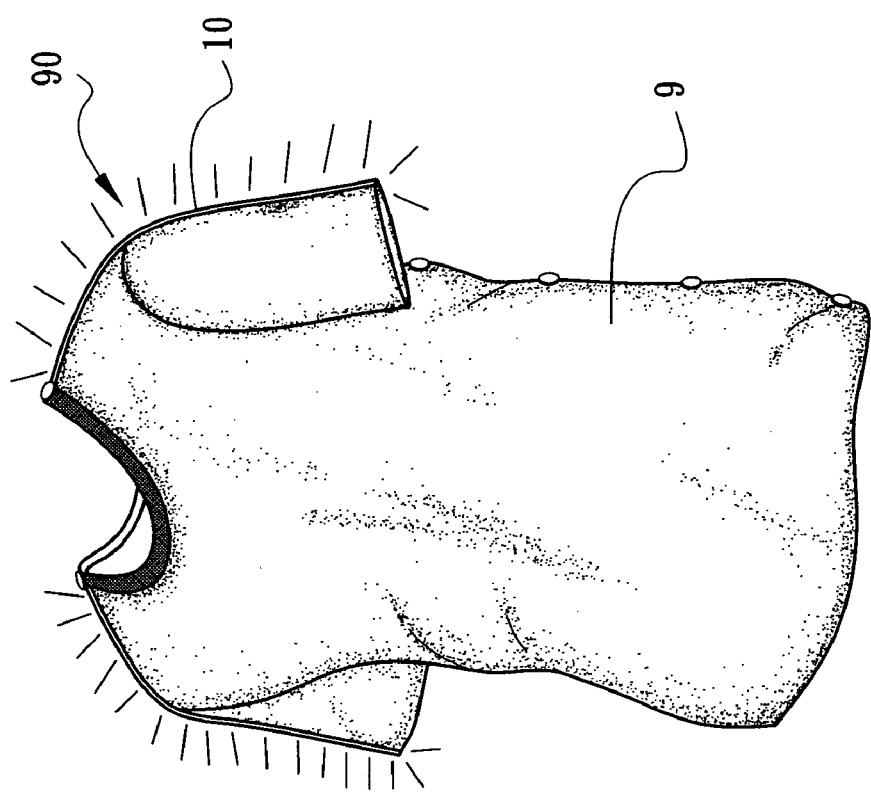
FIG. 10 is a perspective view showing that the present invention is applied to a wear as a light-emitting decorative strip.

Referring to FIG. 6, the light guide strip body 10 is a flexible soft strip body. The flexible soft strip body is applicable to a pole 50 of a road warning sign 5 to form an anti-collision light-emitting safety sign. The recessed/raised sections 12 inside the light guide strip body 10 are able to enlarge and elongate (expand) the lighting range so as to enhance the indicating or warning effect for a road user in a remote place. Accordingly, the road user can have longer reaction time before possible collision so as to minimize the possibility of accident. In addition, the light guide strip body 10 (at least a free end thereof) is jacketed with an outer protective sheath 15 to protect the light guide strip body 10 from interference and damage by humidity, dust and other alien articles. In FIG. 7, the flexible light guide strip body 10 is used as a light-emitting shape highlighter 60 for a motorcycle 6. In FIG. 8, the flexible light guide strip body 10 is used as a light-emitting link 70 between road barriers 7. In FIG. 9, the flexible light guide strip body 10 is used as a light-emitting decoration 80 of an archway 8. In FIG. 10, the flexible light guide strip body 10 is used as a light-emitting decorative strip 90 of a wear 9. According to the aforesaid, the present invention has great versatility and is widely applicable to various fields.

The above embodiments are only used to illustrate the present invention, not intended to limit the scope thereof. Many modifications of the above embodiments can be made without departing from the spirit of the present invention.

What is claimed is:

1. A light-emitting strip structure with light guiding effect, comprising:
   light guide strip body integrally formed of a transparent material, the light guide strip body having a hollow axial internal chamber formed therein, wherein at least one recessed/raised section is formed on a wall of the internal chamber for changing a light path and emitting light to an outer side of the light guide strip body;
   wherein a photosensitive gas is filled in the internal chamber.

2. The light-emitting strip structure with light guiding effect as claimed in claim 1, wherein a light absorption material is disposed on the wall of the internal chamber.

3. The light-emitting strip structure with light guiding effect as claimed in claim 1, wherein a color bar is implanted in the internal chamber.

4. The light-emitting strip structure with light guiding effect as claimed in claim 2, wherein a color bar is implanted in the internal chamber.

5. The light-emitting strip structure with light guiding effect as claimed in claim 1, wherein a light reflection strip is implanted in the internal chamber.

6. The light-emitting strip structure with light guiding effect as claimed in claim 2, wherein a light reflection strip is implanted in the internal chamber.

7. The light-emitting strip structure with light guiding effect as claimed in claim 1, wherein the recessed/raised section is a recessed/raised stripe.

8. The light-emitting strip structure with light guiding effect as claimed in claim 2, wherein the recessed/raised section is a recessed/raised stripe.

9. The light-emitting strip structure with light guiding effect as claimed in claim 7, wherein the recessed/raised stripe is axially extending recessed/raised stripe.

10. The light-emitting strip structure with light guiding effect as claimed in claim 1, wherein the recessed/raised sections are recessed/raised dots distributed over the wall of the internal chamber.

11. The light-emitting strip structure with light guiding effect as claimed in claim 2, wherein the recessed/raised sections are recessed/raised dots distributed over the wall of the internal chamber.

12. The light-emitting strip structure with light guiding effect as claimed in claim 1, wherein the recessed/raised sections are multiple axial parallel recessed/raised stripes.

13. The light-emitting strip structure with light guiding effect as claimed in claim 1, wherein an outer circumference of the light guide strip body is formed with a channel.

14. The light-emitting strip structure with light guiding effect as claimed in claim 2, wherein an outer circumference of the light guide strip body is formed with a channel.

15. The light-emitting strip structure with light guiding effect as claimed in claim 3, wherein an outer circumference of the light guide strip body is formed with a channel.

16. The light-emitting strip structure with light guiding effect as claimed in claim 1, wherein a light source is arranged at least one end of the light guide strip body.

17. The light-emitting strip structure with light guiding effect as claimed in claim 2, wherein a light source is arranged at least one end of the light guide strip body.

18. The light-emitting strip structure with light guiding effect as claimed in claim 3, wherein a light source is disposed at least one end of the light guide strip body.

19. The light-emitting strip structure with light guiding effect as claimed in claim 16, wherein the light source is disposed in a base seat.

20. The light-emitting strip structure with light guiding effect as claimed in claim 1, wherein the light guide strip body is flexible.

21. The light-emitting strip structure with light guiding effect as claimed in claim 2, wherein the light guide strip body is flexible.

22. The light-emitting strip structure with light guiding effect as claimed in claim 3, wherein the light guide strip body is flexible.

23. The light-emitting strip structure with light guiding effect as claimed in claim 1, wherein the light guide strip body is jacketed with an outer protective sheath.

24. The light-emitting strip structure with light guiding effect as claimed in claim 2, wherein the light guide strip body is jacketed with an outer protective sheath.

25. The light-emitting strip structure with light guiding effect as claimed in claim 3, wherein the light guide strip body is jacketed with an outer protective sheath.

26. A light-emitting strip structure with light guiding effect, comprising:
   light guide strip body integrally formed of a transparent material, the light guide strip body having a hollow axial internal chamber formed therein, wherein at least one recessed/raised section is formed on a wall of the internal chamber for changing a light path and emitting light to an outer side of the light guide strip body;
   wherein an outer circumference of the light guide strip body is formed with a channel.

27. The light-emitting strip structure with light guiding effect as claimed in claim 26, wherein a light source is disposed at least one end of the light guide strip body.

28. The light-emitting strip structure with light guiding effect as claimed in claim 26, wherein the light guide strip body is flexible.

29. The light-emitting strip structure with light guiding effect as claimed in claim 26, wherein the light guide strip body is jacketed with an outer protective sheath.

30. A light-emitting strip structure with light guiding effect, comprising:
   light guide strip body integrally formed of a transparent material, the light guide strip body having a hollow axial internal chamber formed therein, wherein at least one recessed/raised section is formed on a wall of the internal chamber for changing a light path and emitting light to an outer side of the light guide strip body;
   wherein a color bar is implanted in the internal chamber; and
   wherein an outer circumference of the light guide strip body is formed with a channel.

\* \* \* \* \*